US006706852B2

(12) United States Patent
Duan et al.

(10) Patent No.: US 6,706,852 B2
(45) Date of Patent: Mar. 16, 2004

(54) PARTIALLY ESTER-EXCHANGED SIPM AND PROCESS THEREWITH

(75) Inventors: Jiwen F. Duan, Apex, NC (US); Xianyin Ma, Wangjing New City (CN)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/187,549

(22) Filed: Jul. 2, 2002

(65) Prior Publication Data

US 2004/0006194 A1 Jan. 8, 2004

(51) Int. Cl.$^7$ ............................................. C08G 63/68
(52) U.S. Cl. ........................ 528/295; 528/275; 528/286; 528/302; 528/308; 528/308.6; 525/437; 525/444; 524/777; 524/779
(58) Field of Search .................. 528/275, 286, 528/295, 302, 308, 308.6; 525/437, 444, 777, 779; 524/777, 779

(56) References Cited

U.S. PATENT DOCUMENTS

| | | |
|---|---|---|
| 4,611,049 A | 9/1986 | Kuratsuji et al. |
| 5,097,004 A | 3/1992 | Gallagher et al. |
| 5,559,205 A | 9/1996 | Hansen et al. |
| 6,075,115 A | 6/2000 | Putzig et al. |
| 6,479,619 B1 * | 11/2002 | Duan ........................ 528/286 |

FOREIGN PATENT DOCUMENTS

| | | |
|---|---|---|
| EP | 0 847 960 A1 | 6/1998 |
| JP | G-170911 A | 8/1994 |
| JP | 11-100722 | 4/1999 |
| WO | WO 99/09238 A1 | 2/1999 |
| WO | WO 00/26301 A1 | 5/2000 |

OTHER PUBLICATIONS

Vejrosta, J. et al; Separation of alkali metal carboxybenesuphonate and their 2–hydroxyl esters on Sephadex LH–20 gel, J. Chrmoatography, vol. 109 (1975), pp. 101–106.
Vejrosta, J. et al; Kinetics of esterification of sodium 3,5–dicarboxybenesuphonate with ethylene glycol catalyzed by titanium (IV) and Ti (II) ions, Collect Czech. Chem. Commun. vol. 43 (1978), pp. 424–433.
Datye, Colourage, Feb. 1994, pp. 7–12.
Chemical Fibers International, Vol 48, Dec. 1998, pp. 508–513.

* cited by examiner

*Primary Examiner*—Samuel A. Acquah
(74) *Attorney, Agent, or Firm*—Lucas K. Shay

(57) ABSTRACT

A process for producing a partially ester-exchanged SIPM such as an alkali metal bis(2-hydroxyethyl) 5-sulfoisophthalate produced from an alkali metal dimethyl 5-sulfoisophthalate in an alcohol is disclosed. The partially ester-exchanged SIPM in an alcohol can be used to copolymerize with oligomer of terephthalic acid or dimethyl terephthalate and an alcohol. Also disclosed is a process for controlling the color of a dyeable polyester using a phosphorous compound.

27 Claims, No Drawings

PARTIALLY ESTER-EXCHANGED SIPM AND PROCESS THEREWITH

FIELD OF THE INVENTION

This invention relates to a process for producing a partially ester-exchanged metal salt of dimethyl sulfoisophthalate solutions in an alcohol from a metal salt of dimethyl sulfoisophthalate and to a process for producing a polymer comprising repeat units derived from sulfoisophthalic acid or salt thereof or ester thereof, a carbonyl compound, and an alcohol.

BACKGROUND OF THE INVENTION

Polyesters are widely used to manufacture textile fibers and bottle resins and can be manufactured by combining an alcohol such as ethylene glycol and a carbonyl compound such as dimethyl terephthalate (DMT) or terephthalic acid (TPA). For example, DMT reacts with an alcohol such as ethylene glycol to form bis-glycolate ester of terephthalate ("monomer") in the ester exchanger column. The monomer is polymerized by condensation reactions in one or two prepolymerizers and then a final polymerizer or finisher. TPA can be combined with ethylene glycol to form a slurry at 60 to 80° C. followed by injecting the slurry into an esterifier. Linear oligomer with degree of polymerization less than 10 is formed in one or two esterifier (first and second, if two) at temperatures from 240° C. to 290° C. The oligomer is then polymerized in one or two prepolymerizers and then in a final polymerizer or finisher at temperatures from 250° C. to 300° C.

Additives such as catalysts, stabilizers, delusterants, and toners are often added to the TPA slurry before the esterifier, in the esterifier, or in the oligomer before the prepolymerizer. Commercial polyester processes commonly use antimony compounds as polycondensation catalyst and phosphorous compounds as stabilizers. See generally, Encyclopedia of Chemical Technology, 4$^{th}$ edition, John Wiley, New York. 1994, Volume 10, pages 662–685 and Volume 19, pages 609–653.

However, it is difficult to incorporate a dye material into or onto these polyesters. Therefore, copolymers comprising repeat units derived from terephthalic acid, sulfoisophthalic acid, and glycol are widely used because they can be used to make fibers dyeable by basic dyes or polyester hydrolyzable in water. Such copolymers are referred to as cationic dyeable (CD) polyesters and can be produced by adding small amounts of a sulfonated isophthalate metal salt or its ester such as, for example, sodium dimethylsulfoisophthalate (Na-SIPM) powder to the ester exchanger of DMT process. Fiber made from CD copolymer gives brilliant shades on dyeing with basic/cationic dyes and also dyes with disperse dyes to deeper shades.

U.S. Pat. No. 5,559,205 discloses a process for adding fully esterifted bis(2-hydroxyethyl) sodium 5 sulfoisophthalate (Na-SIPEG) or bis(2-hydroxyethyl) lithium 5-sulfoisophthalate (Li-SIPEG) to the monomer line of DMT process, or oligomer line or the second esterifier of TPA process to make cationic dyeable polyesters.

U.S. Pat. No. 6,075,115 discloses a process for making Na-SIPEG solution and Li-SIPEG solution from sodium 5-sulfoisophthalic acid (Na-SIPA) and lithium 5-sulfoisophthalic acid (Li-SIPA) powder. In order to fully esterify Na-SIPA and Li-SIPA, special titanium catalyst was used, which comprises (1) a titanium compound, a solubility promoter, a phosphorus source, and optionally a solvent, or (2) a titanium compound, a complexing agent, a phosphorus source, and optionally a solvent, a sulfonic acid. The fully esterfied Na-SIPEG and Li-SIPEG solutions were manufactured by a vendor and then shipped to polyester producers. The solution was then injected into the monomer line of DMT process, or oligomer line or the second esterifier of TPA process, or the second or third vessel of batch polymerization process to make copolyesters.

A metal salt of 5-sulfoisophthalic acid fully esterified with methanol is also commercially available. For example, sodium dimethyl 5-sulfoisophthalate (Na-SIPM) can be purchased from E. I. Du Pont de Nemours and Company, Wilmington, Del., USA (Hereinafter "DuPont").

It has been commercially practiced to fully ester exchange Na-SIPM with ethylene glycol to produced Na-SIPEG solution in the glycol. Manganese acetate catalyst is used as ester exchange catalyst. Sodium acetate can be added to reduce ether formation. The Na-SIPEG solution is then shipped to polyester producers and added to polyester process.

The processes using fully esterified Na-SIPEG have several disadvantages including the following. About 15 to 20% of Na-SIPEG forms dimer, trimer, and other low molecular weight oligomers due to long reaction time, making its distribution in polyester molecular chains not uniform, which affect spinning and texturing performance. The Na-SIPEG solution must be diluted to 20% or lower to be added into DMT monomer line or TPA oligomer line for acceptable spinning and texturing performance. Cost of 20% Na-SIPEG solution is high because a separate facility is required to make the solution from Na-SIPM powder and glycol. The transportation cost for the 20% solutions is high. High investment cost is needed to build a heated storage tank, pump, and piping system for the 20% solutions. CD polyester producers cannot control the properties of the solutions such as DEG (diethylene glycol). The processes using fully esterified Li-SIPEG have similar disadvantages.

Therefore, there is a need to develop a process to produce a partially ester-exchanged metal salts of dimethyl 5-sulfoisophthalate that are more stable at room temperature, especially at high concentrations. An advantage of using partially ester-changed metal salts of dimethyl 5-sulfoisophthalate is that less dimer, trimer, and other low molecular weight oligomer are produced resulting a more uniform basic dye site distribution in the resulting polymer. Another advantage is that higher concentration equivalent to 40% to 60% Na-SIPEG can be injected into DMT monomer line or TPA oligomer line. Also an advantage is that manganese catalyst is not required. A further advantage of the invention is that the partially ester-exchanged metal salts of 5-sulfoisophthalate can be made immediately before it is used in producing polyester thereby significantly reducing manufacturing and transportation cost.

Additionally, it is well known that phosphoric acid is commonly used to control the discoloration of polyester homopolymer, but phosphoric acid in some cases does not improve the color of copolymer derived from terephthalic acid and sulfoisophthalic acid. Thus, there is also a need to develop a process using a phosphorus compound, especially those non-acidic ones, to improve the color of dyeable polyester.

SUMMARY OF THE INVENTION

A process that can be used for producing a partially ester-exchanged metal salt of dimethyl 5-sulfoisophthalate is disclosed, which comprises contacting a metal salt of dimethyl 5-sulfoisophthalate with a glycol to produce a mixture and heating the mixture under a condition sufficient to partially ester-exchange the methyl group in the metal salt of dimethyl 5-sulfoisophthalate wherein the mixture optionally comprises a catalyst.

Also disclosed is a process for producing a dyeable polyester. The process comprises contacting, optionally in the presence of a phosphorus compound and/or a catalyst, a partially ester-exchanged metal salt of dimethyl 5-sulfoisophthalate with either (a) a polymerization mixture comprising a carbonyl compound and a second glycol or (b) an oligomer derived from a carbonyl and a second glycol.

DETAILED DESCRIPTION OF THE INVENTION

The acronym "SIPM" used in the application can have the formula of $(RO(O)C)_2ArS(O)_2OM'$ in which R is methyl group or mixture of methyl group and hydrogen; and M' is hydrogen, an alkali metal, an alkaline earth metal, quatemary ammonium or phosphonium, or combinations of two or more thereof. The preferred M' is an alkali metal such as lithium or sodium. Accordingly, SIPM, unless otherwise specifically indicated, can also include those metal salts of 5-sulfoisoterephthalic acid that are partially or fully esterified with methanol. As such, "SIPM", unless otherwise specifically indicated, can be any metal salt of dimethyl sulfoisophthalate. For example, Na-SIPM and Li-SIPM are referred to, because they are specifically indicated, sodium dimethyl sulfoisophthalate and lithium dimethyl sulfoisophthlalate, respectively.

The term "metal salt of dimethyl sulfoisophthalate" or "SIPM", therefore, refers to a metal salt of sulfoisoterephthalic acid in which the protons in the COOH groups are replaced, partially or fully, with methyl groups to become $COOCH_3$. Examples of SIPM include, but are not limited to, dimethyl 5-sulfoisophthalate; alkali metal salt of dimethyl 5-sulfoisophthalate such as sodium dimethyl 5-sulfoisophthalate, lithium dimethyl 5-sulfoisophthalate; a mono- or di-ester of dimethyl 5-sulfoisophthalic acid; a mono- or di-ester of alkali metal salt of dimethyl 5-sulfoisophthalate.

The term "partially ester-exchanged metal salt of dimethyl sulfoisophthalate" (hereinafter referred to as "partially ester-exchanged SIPM") refers to an SIPM in which about 50% to about 99%, preferably about 70 to about 95%, most preferably 80 to 90% of the methyl groups in SIPM has been replaced with a lower alkyl group other than methyl group such as, for example, ethyl, propyl, isopropyl, butyl, isobutyl, sec-butyl, tert-butyl, pentyl, or combinations or two or more thereof. In other words, a "partially ester-exchanged SIPM" can comprise about 50% to about 99%, preferably about 70 to about 95%, most preferably 80 to 90% of a lower alkyl group other than methyl group as its ester group.

Any glycol that can esterify SIPM can be used as the glycol of the invention. The preferred glycol can have 2 to about 10, preferably 2 to about 8, and most preferably 2 to 4 carbon atoms per molecule such as, for example, an alkylene glycol, a polyalkylene glycol, polyoxyalkylene glycol, or combinations thereof. Examples of suitable glycols include, but are not limited to, ethylene glycol, propylene glycol, isopropylene glycol, butylene glycol, 1-methyl propylene glycol, pentylene glycol, diethylene glycol, triethylene glycol, polyethylene glycols, polyoxyethylene glycols, polyoxypropylene glycols, polyoxybutylene glycols, and combinations of two or more thereof. The presently most preferred glycol is an alkylene glycol such as ethylene glycol or 1,3-propanediol for the polyester produced therefrom has a wide range of industrial applications.

Examples of partially ester-exchanged SIPM include, but are not limited to, combination of: lithium dimethyl 5-sulfolsophthalate, lithium bis(2-hydroxyethyl) 5-sulfoisophthalate; sodium dimethyl 5-sulfoisophthalate, sodium bis(2-hydroxyethyl) 5-sulfoisophthalate; sodium dimethyl 5-sulfoisophthalate, sodium bis(3-hydroxypropyl) 5-sulfoisophthalate; lithium dimethyl 5-sulfoisophthalate, lithium bis(2-hydroxyethyl) 5-sulfoisophthalate, sodium bis (2-hydroxyethyl) 5-sulfoisophthalate; lithium dimethyl 5-sulfoisophthalate, lithium bis(2-hydroxyethyl) 5-sulfoisophthalate, sodium dimethyl 5-sulfoisophthalate, sodium bis(2-hydroxyethyl) 5-sulfoisophthalate; and combinations of two or more thereof.

A metal SIPM can be combined with a glycol in any suitable manner and in any suitable container, vessel, or reactor to produce a metal SIPM-glycol mixture. The quantity of the metal SIPM can be any quantity so long as the quantity can produce a desired partially ester-exchanged metal SIPM. Generally, based on total weight of the metal SIPM-glycol mixture, the metal SIPM can be present in the range of about 5% to about 70%, preferably about 10% to about 50%, and most preferably 20% to 30% by weight. The quantity can also be expressed by those that can produce the desired partially ester-exchanged SIPM disclosed above.

A catalytic quantity of a catalyst such as, for example, a metal salt such as sodium acetate anhydrous or sodium acetate trihydrate or lithium acetate or lithium acetate dihydrate can be added to the SlPM-qlycol mixture in the amount of about 0.2 to about 200 g, preferably 2 to 20 g, per kg SIPM (or molar ratio of catalyst to SIPM from about 0.002:1 to about 0.15:1, preferably 0.01:1 to 0.1:1) to accelerate the ester exchange reaction and to control the formation of diethylene glycol and to achieve the desired methyl group removal or exchange of about 50% to about 99%, preferably about 70 to about 95%, and most preferably 80 to 90%. Manganese catalyst is not required.

The metal SlPM-glycol mixture, generally in slurry form, can be heated at about 60° C. to about 250° C., preferably about 100° C. to about 200° C., and most preferably 140° C. to 190° C. for at least about 5 minutes, preferably about 1 to about 10 hours to produce solution of partially ester-exchanged SIPM. Such exchange also produces vapor of methanol, which along with any glycol, can be condensed in a condenser or discharged in the air, or flow to a water separation column. Thereafter, the resulting solution can be further heated at the same or lower temperature. The solution, whether further heated or not, can be directly used in a process for producing polyester such as, for example, being injected into the monomer line or prepolymerizer of DMT process, or the oligomer line or the second esterifier or prepolymerizer of TPA process, or the second or third vessel of batch polymerization process discussed in the BACKGROUND OF THE INVENTION.

Optionally, de-foaming agent such as, for example, polydimethylsiloxane (or its emulsion or solution) can be introduced into the metal SIPM-glycol mixture slurry (before, during or after the slurry is heated) or solution (while solution is being formed or continually heated or cooled). The de-foaming agent can reduce surface tension thereby preventing the slurry or solution from foaming and stabilizing the subsequent polycondensation process, if the solution is used for producing polyester. Because the de-foaming agents are so well known to one skilled in the art, the description is omitted herein in the interest of brevity.

According to another embodiment of the invention, a process comprises contacting, optionally in the presence a phosphorus compound and/or a catalyst, either (a) a partially ester-exchanged SIPM with a polymerization mixture comprising a carbonyl compound and a second glycol or (b) a partially ester-exchanged SIPM with an oligomer derived from a carbonyl compound and a second glycol.

The catalyst and partially ester-exchanged SIPM can be the same as those disclosed above and the disclosures of which are incorporated here. The second glycol can be the same or different from the above-disclosed glycol. The presently preferred second glycol is ethylene glycol, 1,3-propanediol, or combinations thereof.

Any phosphorus compound that, when used with a polyester catalyst, produces polyester having low yellowness, as compared to a polyester produced from a catalyst without such phosphorus compound, can be used. Examples of suitable phosphorus compounds include, but are not limited to, a polyphosphoric acid or a salt thereof, a phosphonate ester, a pyrophosphoric acid or salt thereof, a pyrophosphorous acid or salt thereof, phosphoric acid or its salts, phosphorous acid or its salts, and combinations of two or more thereof. The polyphosphoric acid can have the formula of $H_{n+2}P_nO_{3n+1}$ in which n is $\geq 2$. The phosphonate ester can have the formula of $(R^2O)_2P(O)ZCO_2R^2$ in which each $R^2$ can be the same or different and can be independently H, $C_{1-4}$ alkyl, or combinations thereof, and Z is $C_{1-5}$ alkylene, $C_{1-5}$ alkylidene, or combinations thereof, di(polyoxyethylene) hydroxymethyl phosphonate, and combinations of two or more thereof. The salt can be an alkali metal salt, alkaline earth metal salt, ammonium salt, or combinations of two or more thereof.

Illustrative examples of suitable phosphorus compounds include, but are not limited to, potassium tripolyphosphate, sodium tripolyphosphate, potassium tetra phosphate, sodium pentapolyphosphate, sodium hexapolyphosphate, potassium pyrophosphate, potassium pyrophosphite, sodium pyrophosphate, sodium pyrophosphate decahydrate, sodium pyrophosphite, ethyl phosphonate, propyl phosphonate, hydroxymethyl phosphonate, di(polyoxyethylene) hydroxymethyl phosphonate, methylphosphonoacetate, ethyl methylphosphonoacetate, methyl ethylphosphonoacetate, ethyl ethylphosphonoacetate, propyl dimethylphosphonoacetate, methyl diethylphosphonoacetate, triethyl phosphonoacetate, phosphoric acid or salt, phosphorous acid or salt, or combinations of two or more thereof.

The phosphorus compound can be present in the process before, during, or after a carbonyl compound or ester thereof is esterified or transesterified. Similarly, it can be present before, during, or after the polycondensation stage. The phosphorus compound can be used to inhibit the catalytic activity of a titanium-containing catalyst or other catalysts or trace elements such as manganese, cobalt, zinc, aluminum, iron, lead, silicon, to reduce the discoloration of polyester produced using a titanium-containing catalyst or other catalysts or trace elements, or both. The phosphorus compound can be mixed with the catalyst, such as titanium, antimony, manganese, zinc, before the catalyst is introduced to the polyester reaction process. Alternatively, the phosphorous compound can be introduced to the process separately before or after the catalyst is introduced.

Any carbonyl compound, which when combined with an alcohol, can produce a polyester can be used. Such carbonyl compounds include, but are not limited to, acids, esters, amides, acid anhydrides, acid halides, salts of carboxylic acid oligomers or polymers having repeat units derived from an acid, or combinations of two or more thereof. The presently preferred acid is an organic acid such as a carboxylic acid or salt thereof. The oligomer of a carbonyl compound such as TPA and glycol generally has a total of about 2 to about 100, preferably from about 2 to about 20 repeat units derived from the carbonyl compound and glycol.

Examples of suitable organic acids include, but are not limited to, terephthalic acid, isophthalic acid, napthalic acid, succinic acid, adipic acid, phthalic acid, glutaric acid, oxalic acid, maleic acid, and combinations of two or more thereof. Examples of suitable esters include, but are not limited to, dimethyl adipate, dimethyl phthalate, dimethyl terephthalate, dimethyl glutarate, and combinations of two or more thereof. The presently preferred organic diacid is terephthalic acid or its ester dimethyl terephthalate because the dyeable polyesters produced therefrom have a wide range of industrial applications.

The contacting of the carbonyl compound and second glycol in the presence of the catalyst can be carried out by any suitable means.

Any suitable condition to effect the production of a polyester can include a temperature in the range of from about 150° C. to about 500° C., preferably about 200° C. to about 400° C., and most preferably 250° C. to 300° C. under a pressure in the range of from about 0.001 to about 1 atmosphere for a time period of from about 0.2 to about 20, preferably about 0.3 to about 15, and most preferably 0.5 to 10 hours.

The molar ratio of the second glycol to carbonyl compound can be any ratio so long as the ratio can effect the production of an ester or polyester. Generally the ratio can be in the range of from about 1:1 to about 10:1, preferably about 1:1 to about 5:1, and most preferably 1:1 to 4:1. The CD polyester produced by the invention process can comprise about 1 to about 200 parts per million by weight (ppm) of titanium and about 1 to about 200 ppm, preferably about 5 to about 100 ppm, of phosphorus. If two or more carbonyl compounds are employed, the molar ratio of the second or third carbonyl compound to the first carbonyl compound can each be in the range of from about 0.0001:1 to about 1:1.

For example, a dyeable polyester can comprise 85 mole % to 99.9 mole % of repeat units derived from terephthalic acid or terephthalate and 0.1 mole % to 15 mole % of repeat units derived from sodium 5-sulfoisophthalic acid or lithium 5-sulfoisophthalic acid.

The catalyst can be a titanium, cobalt, antimony, manganese, or zinc catalyst commonly employed in the manufacture of polyester. A preferred antimony compound can be any antimony compound that is substantially soluble in a solvent disclosed above. Examples of suitable antimony compounds include, but are not limited to, antimony oxides, antimony acetate, antimony hydroxides, antimony halides, antimony sulfides, antimony carboxylates, antimony ethers, antimony glycolates, antimony nitrates, antimony sulfates, antimony phosphates, and combinations of two or more thereof. The catalyst, expressed as element Co, Sb, Mn, Zn, or Ti, Al, Si, can be present in the range of about 0.001 to about 30,000 ppm of the medium comprising the carbonyl compound and glycol, preferably about 0.1 to about 1,000 ppm, and most preferably 1 to 100 ppm by weight. A co-catalyst, if present, can be in the range of from about 0.01 to about 1,000 ppm of the reaction medium. The description of these catalysts is omitted herein because such catalyst is well known to one skilled in the art.

A titanium-containing catalyst can be produced by any means known to one skilled in the art such as those disclosed in U.S. Pat. No. 6,066,714 and U.S. Pat. No. 6,166,170 discussed above and description of which is omitted herein for the interest of brevity. Examples of commercially available organic titanium compounds include, but are not limited to, TYZOR® TPT and TYZOR® TBT (tetra isopropyl titanate and tetra n-butyl titanate, respectively) available from DuPont.

The invention process can also be carried out using any of the conventional melt or solid state techniques and in the presence or absence of a toner compound to reduce the color of a polyester produced. Example of toner compounds include, but are not limited to, cobalt aluminate, cobalt acetate, Carbazole violet (commercially available from Hoechst-Celanese, Coventry, R.I., USA, or from Sun Chemical Corp, Cincinnati, Ohio, USA), Estofil Blue S-RLS® and Solvent Blue 45™ (from Sandoz Chemicals, Charlotte, N.C., USA, CuPc Blue (from Sun Chemical Corp, Cincinnati, Ohio, USA). These toner compounds are well known to one skilled in the art and the description of which is omitted herein. The toner compound can be used with the catalyst disclosed herein in the amount of about 0.1 ppm to 1000 ppm, preferably about 1 ppm to about 100 ppm, based on the weight of polyester produced.

The invention process can also be carried out using any of the conventional melt or solid state techniques and in the presence or absence of an optical brightening compound to reduce the yellowness of the polyester produced. Example of optical brightening compounds include, but are not limit to, 7-naphthotriazinyl-3-phenylcoumarin (commercial name "Leucopure EGM", from Sandoz Chemicals, Charlotte, N.C., USA.), 4,4'-bis(2-benzoxazolyl) stilbene (commercial name "Eastobrite", from Eastman Chemical, Kingsport, Tenn., USA). These optical brightening compounds are well known to one skilled in the art and the description of which is omitted herein. The optical brightening compound can be used with the catalyst disclosed herein in the amount of about 0.1 ppm to 10000 ppm, preferably about 1 ppm to about 1000 ppm, based on the weight of polyester produced.

EXAMPLES

The following examples are included to further illustrate the invention and are not to be construed as to unduly limit the scope of the invention.

Unconverted methyl esters in the solution was analyzed by gas chromatograph (GC). Methanol was liberated from methyl esters in the sample by refluxing with 2-aminoethanol (2AE). The 2AE contains ethanol as an internal standard. The heated mixture was diluted with 1-butanol, cooled and a sample from the liquid layer was injected into a GC. The ratio of the areas of methanol (generated from unconverted methyl esters) and ethanol, corrected for sample weight and response factor, was converted to weight % unconverted methyl esters.

Diethylene glycol (DEG) in the partially ester-exchanged SIPM solution was analyzed in the same way as DEG in polymer, which requires depolymerization. The samples were treated with 2-aminoethanol (2AE) containing benzyl alcohol (BA) as an internal standard. The reaction mixture was diluted with isopropyl alcohol and injected into a gas chromatograph. The ratio of the areas of the DEG and BA peaks, corrected for the sample weight, was translated by a calibration factor into weight percent DEG.

Polymer molecular weight was measured by intrinsic viscosity (IV). The IV was expressed as LRV (laboratory relative viscosity). LRV was the ratio of the viscosity of a solution of 0.8 g of polymer dissolved at room temperature in 10 ml of hexafluoroisopropanol (HFIP) containing 100 ppm sulfuric acid to the viscosity of the sulfuric acid containing HFIP itself, both measured at 25° C. in a capillary viscometer. The use of HFIP as a solvent is important in that it allows dissolution at the specified temperature thereby avoiding the polymer degradation normally encountered when polyesters are dissolved at elevated temperatures.

Example 1

This example illustrates the preparation of partially ester-exchanged Na-SIPM solution.

Ethylene glycol (EG; 800 g), dimethyl sodium 5-sulfoisophthalate (Na-SIPM; 400 g; obtained from DuPont), and sodium acetate anhydrous (NaAc; 8.0 g, obtained from Jarchem Industries, Newward, N.J. USA) were added to a 1500 ml flask to produce a slurry. Total weight of the mixture was 1208 g. The flask was covered by an aluminum foil with a small hole for methanol vapor flow. The slurry in the flask was stirred with a magnet stirrer on a heating plate.

It took 32 minutes to heat the agitated slurry from 27 to 141° C. Na-SIPM powder was completely dissolved when the temperature reached 141° C. Boiling started at about 141° C. After 96 minutes, the solution temperature gradually increased from 141 to 159° C., averaged 148° C. in this period. Solution weight decreased from 1208 g to 1136 g due to the evaporation of methanol. Then, 64 g ethylene glycol was added to make the total solution 1200 g. The solution was clear after cooling without forming solid or gel. GC analysis indicated 79% of methanol groups converted and evaporated. Material balance indicated 72 g were evaporated, in which 69 g were methanol, 3 g were ethylene glycol. From laboratory analysis. DEG (diethylene glycol) was 0.021% in the solution.

Example 2

This example illustrate the polymerization of copolymer containing 2% by mole of partially ester-exchanged Na-SIPM solution from DMT monomer in an autoclave.

DMT (dimethyl terephthalte; obtained from DuPont; 18.1 kg), 12.5 kg ethylene glycol and 400 ml catalyst in ethylene glycol solution containing 8.2 g manganese acetate tetrahydrate and 5.4 g antimony oxide $Sb_2O_3$ were charged to a still of stainless steel. The top of condensing column was controlled at 85° C. Then, 6060 g methanol and 2700 g ethylene glycol were removed from the still. After 205 minutes in the still, the monomer temperature increased to 240° C. The monomer was then dropped to a clave of stainless steel. Phosphoric solution, 80 ml, (prepared by mixing 104 ml 85% $H_3PO_4$ and 2000 ml ethylene glycol) was added to the clave right after the monomer was dropped to clave. Then 1660 g of partially ester-exchanged Na-SIPM solution prepared in Example 1 was added to the clave. Vacuum was gradually reduced from atmospheric pressure to 1 mm Hg in 60 minutes, then held at 1 mm Hg. The clave temperature was controlled at 275° C. Polymerization stopped when the agitator torque reached 30 psi (207 kPa) at 6 rpm. Total time in the clave was 145 minutes. The polymer was quenched and cut into flake. Lab analysis showed Intrinsic viscosity 0.479 (LRV 12.65), DEG 1.297%.

Example 3

This example illustrates polymerization of copolymer containing 2% by mole of partially ester-exchanged NA-SIPM from TPA oligomer in a kettle.

A TPA (terephthalic acid; obtained from DuPont) slurry tank was continuously charged with 44 to 57 kg/hour of TPA. The rate was controlled by a powder screw feeder to keep desired polymer flow rate of 54 kg/hour. Ethylene glycol charged, to make a TPA slurry, at a rate by a mass flow meter such that the molar ratio of ethylene glycol to TPA was 2.2:1. The temperature in the slurry tank was about 80° C. The TPA slurry was injected into a recirculating esterifier at a rate to keep desired polymer flow rate and constant oligomer liquid level in the esterifier. The temperature in the esterifier was controlled at 282 to 284° C. The vapor from the esterifier was condensed and separated into ethylene glycol and water, the ethylene glycol was mixed with fresh ethylene glycol and charged into the TPA slurry. The oligomer from the esterifier was catalyst free and had degree of polymerization 5 to 10.

A pot was preheated to 265° C. A 500 ml resin kettle was provided with a Jiffy Mixer agitator, a thermocouple, condenser and nitrogen sweep. To this kettle it was added 83 g of ethylene glycol, 400 g of terephthalic acid oligomer prepared in the above, 36.36 g of partially ester-exchanged Na-SIPM solution prepared in example 1, 6 g of $TiO_2$ of a 20% slurry in ethylene glycol and 8 g of antimony glycolate solution (containing 1% Sb by weight). The temperature was increased to 265° C. and held there until oligomer liquefied, the agitator was turned on at 60 rpm. Temperature was raised to 275° C. and vacuum reduced to 120 mm Hg and held for 20 minutes. The temperature was then increased to 280° C. and vacuum reduced to 30 mm Hg and hold for 20 minutes. Thereafter, the vacuum was reduced to 1 mm Hg while temperature was held at 280° C. When the torque reached 4 pounds (8.8 Kg), agitator speed was reduced to 40 rpm. Polymerization stopped when the torque reached 4.5 pounds (10 Kg). The polymer melt was poured into a water bath to solidify the melt, and the resultant solid was crystallized at 90° C. in a vacuum oven for 1 hours and ground to pass through a 2 mm filter. The grounded polymer was dried in the oven at 90° C. for another hour. The polymer had good color. Lab analysis: Intrinsic viscosity 0.571 (LRV 16.11), DEG 1.633%.

What is claimed is:

1. A process comprising contacting a metal SIPM with an alkylene glycol to produce a mixture and heating said mixture under a condition sufficient to effect the production of a partially ester-exchanged SIPM solution.

2. A process according to claim 1 wherein about 50% to about 99% of the methyl groups in said metal SIPM are replaced with the alkyl group derived from said glycol.

3. A process according to claim 1 wherein said partially ester-exchanged SIPM solution is selected from the group consisting of combination of lithium dimethyl 5-sulfoisophthalate, lithium bis(2-hydroxyethyl) 5-sulfoisophthalate; combination of sodium dimethyl 5-sulfolsophthalate, sodium bis(2-hydroxyethyl) 5-sulfoisophthalate; combination of sodium dimethyl 5-sulfoisophthalate, sodium bis(3-hydroxypropyl) 5-sulfoisophthalate; combination of lithium dimethyl 5-sulfoisophthalate, lithium bis(2-hydroxyethyl) 5-sulfoisophthalate, sodium bis(2-hydroxyethyl) 5-sulfoisophthalate; combination of lithium dimethyl 5-sulfoisophthalate, lithium bis(2-hydroxyethyl) 5-sulfoisophthalate, sodium dimethyl 5-sulfoisophthalate, sodium bis(2-hydroxyethyl) 5-sulfoisophthalate; and combinations of two or more thereof.

4. A process according to claim 1 about 80% to about 95% of carboxyl groups in said metal SIPM are replaced with said glycol.

5. A process according to claim 3 about 80% to about 95% of carboxyl groups in said metal SIPM are replaced with said glycol.

6. A process according to claim 1 wherein said process is carried out in the presence of a catalytic amount of a catalyst.

7. A process according to claim 5 wherein said process is carried out in the presence of a catalytic amount of a metal acetate.

8. A process according to claim 7 wherein said metal acetate is lithium acetate, sodium acetate, or combinations thereof.

9. A process according to claim 2 wherein said mixture is heated to a temperature in the range of 140° C. to 190° C.

10. A process according to claim 8 wherein said mixture is heated to a temperature in the range of 140° C. to 190° C.

11. A process comprising contacting a partially ester-exchanged SIPM solution in a first glycol with (1) a mixture comprising a carbonyl compound and a second glycol or (2) an oligomer having 2 to about 100 repeat units derived from said carbonyl compound and said second glycol under a condition effective to produce a polymer comprising repeat units derived from said SIPM, said first glycol, said second glycol, and said carbonyl compound wherein each of said first glycol and said second glycol is independently selected from the group consisting of an alkylene glycol, a polyalkylene glycol, polyoxyalkylene glycol, and combinations of two or more thereof.

12. A process according to claim 11 wherein each of said first glycol and said second glycol is independently selected from the group consisting of ethylene glycol, propylene glycol, isopropylene glycol, butylene glycol, 1 methyl propylene glycol, pentylene glycol, diethylene glycol, triethylene glycol, polyoxyethylene glycol, polyoxypropylene glycol, polyoxybutylene glycol, and combinations of two or more thereof.

13. A process according to claim 11 wherein each of said first glycol and said second glycol is ethylene glycol or 1,3-propanediol.

14. A process according to claim 13 wherein said carbonyl compound is terephthalic acid, dimethyl terephthalate, or combinations thereof.

15. A process according to claim 12 about 80% to about 95% of the carboxyl groups in said metal SIPM are replaced with said glycol.

16. A process according to claim 14 about 80% to about 95% of the carboxyl groups in said metal SIPM are replaced with said glycol.

17. A process according to claim 16 wherein said partially ester-exchanged SIPM solution is selected from the group consisting of combination of lithium dimethyl 5-sulfoisophthalate, lithium bis(2-hydroxyethyl) 5-sulfoisophthalate; combination of sodium dimethyl 5-sulfoisophthalate, sodium bis(2-hydroxyethyl) 5-sulfoisophthalate; combination of sodium dimethyl 5-sulfoisophthalate, sodium bis(3-hydroxypropyl) 5-sulfoisophthalate; combination of lithium dimethyl 5-sulfoisophthalate, lithium bis(2-hydroxyethyl) 5-sulfoisophthalate, sodium bis(2-hydroxyethyl) 5-sulfoisophthalate; combination of lithium dimethyl 5-sulfoisophthalate, lithium bis(2-hydroxyethyl) 5-sulfoisophthalate, sodium dimethyl 5-sulfoisophthalate, sodium bis(2-hydroxyethyl) 5-sulfoisophthalate, and combinations of two or more thereof.

18. A process comprising contacting, in the presence of a phosphorus compound and a catalyst, a partially ester-exchanged SIPM with either (a) a polymerization mixture comprising a carbonyl compound and a second glycol or (b)

an oligoomer having 2 to about 100 repeat units derived from said carbonyl compound and said second glycol under a condition effective to produce a polymer comprising repeat units derived from said SIPM, said second glycol, and said carbonyl compound wherein said second glycol are each independently selected from the group consisting of an alkylene glycol, a polyalkylene glycol, polyoxyalkylene glycol, and combinations of two or more thereof;

said phosphorus compound is selected from the group consisting of a phosphoric acid or salt thereof, a phosphorous acid or salt thereof, a polyphosphoric acid or a salt thereof, a phosphonate ester, a pyrophosphoric acid or salt thereof, a pyrophosphorous acid or salt thereof, and combinations of two or more thereof; and said phosphorus compound is introduced to said process together with or separate from said catalyst composition.

19. A process according to claim 18 wherein said phosphorus compound is selected from the group consisting of phosphoric acid, sodium phosphate, potassium phosphate, phosphorous acid, potassium tripolyphosphate, sodium tripolyphosphate, potassium tetrapolyphosphate, sodium pentapolyphosphate, sodium hexapolyphosphate, potassium pyrophosphate, potassium pyrophosphite, sodium pyrophosphate, sodium pyrophosphite, ethyl phosphonate, propyl phosphonate, hydroxymethyl phosphonate, di(polyoxyethylene) hydroxymethyl phosphonate, methylphosphonoacetate, ethyl methylphosphonoacetate, methyl ethylphosphonoacetate, ethyl ethylphosphonoacetate, propyl dimethylphosphonoacetate, methyl diethylphosphonoacetate, triethyl phosphonoacetate, and combinations of two or more thereof.

20. A process according to claim 15 wherein said phosphorus compound is potassium tripolyphosphate, potassium pyrophosphate, di(polyoxyethylene) hydroxymethyl phosphonate, or triethyl phosphonoacetate.

21. A process according to claim 19 wherein said second glycol are each independently selected from the group consisting of ethylene glycol, propylene glycol, isopropylene glycol, butylene glycol, 1-methyl propylene glycol, pentylene glycol, diethylene glycol, triethylene glycol, polyoxyethylene glycol, polyoxypropylene glycol, polyoxybutylene glycol, and combinations of two or more thereof.

22. A process according to claim 19 wherein said second is ethylene glycol or 1,3-propanediol.

23. A process according to claim 22 wherein said carbonyl compound is terephthalic acid, dimethyl terephthalate, or combinations thereof.

24. A process according to claim 23 wherein said second glycol is ethylene glycol or 1,3-propanediol.

25. A process according to claim 22 wherein said partially ester-exchanged SIPM solution is selected from the group consisting of combination of lithium dimethyl 5-sulfoisophthalate, lithium bis(2-hydroxyethyl) 5-sulfoisophthalate; combination of sodium dimethyl 5-sulfoisophthalate, sodium bis(2-hydroxyethyl) 5-sulfoisophthalate; combination of sodium dimethyl 5-sulfoisophthalate, sodium bis(2-hydroxyethyl) 5-sulfoisophthalate; combination of lithium dimethyl 5-sulfoisophthalate, lithium bis(2-hydroxyethyl) 5-sulfoisophthalate, sodium bis(2-hydroxyethyl) 5-sulfoisophthalate: combination of lithium dimethyl 5-sulfoisophthalate, lithium bis(2-hydroxyethyl) 5-sulfoisophthalate, sodium dimethyl 5-sulfoisophthalate, sodium bis(2-hydroxyethyl) 5-sulfoisophthalate; and combinations of two or more thereof.

26. A process according to claim 25 wherein said phosphorus compound is introduced into said process before, during, or subsequent to said contacting.

27. A process according to claim 26 wherein said process produces a polymer comprising 85 mole % to 99.9 mole % of repeat units derived from terephthalic acid or terephthalate and 0.1 mole % to 15 mole % of repeat units derived from said partially ester-exchanged SIPM.

* * * * *